United States Patent [19]
Barzegar et al.

[11] Patent Number: 5,574,966
[45] Date of Patent: Nov. 12, 1996

[54] WIRELESS BASE STATION ARCHITECTURE

[75] Inventors: Farhad Barzegar, Hillsborough Township, Somerset County; Robert E. Schroeder, Morris Township, Morris County, both of N.J.

[73] Assignee: Lucent Technologies Inc., Murray Hill, N.J.

[21] Appl. No.: 367,402

[22] Filed: Dec. 30, 1994

[51] Int. Cl.$^6$ .................................................. H04H 1/02
[52] U.S. Cl. .......................... 455/6.1; 455/33.1; 348/13
[58] Field of Search .......................... 455/3.2, 4.1, 6.1, 455/6.3, 33.1, 33.3; 348/723, 725, 13; 370/112, 77; 379/56, 58, 59

[56] References Cited

U.S. PATENT DOCUMENTS 4,747,160  5/1988  Bossard .................................. 455/33.1

Primary Examiner—John K. Peng
Assistant Examiner—Sherrie Hsia

[57] ABSTRACT

A wireless base station architecture that is particularly well-suited for providing audio, video and data services. An exemplary embodiment preferably transmits to all of an area those "common services" (e.g., broadcast television) that are intended to be received by multiple recipients throughout the area, but, in contrast, transmits only into a sector those recipient-specific services (e.g., point-to-point voice services, interactive video services) that are intended for less than all of the recipients in the area. In an exemplary embodiment, a demultiplexor directs both broadcast video and recipient-specific or "sectorized" video signals to a video processor, which prepares them for transmission. The demultiplexor also directs sectorized audio signals to an audio processor/RF combiner, which prepares them for transmission. The video processor preferably directs the broadcast video signals to an antenna, which radiates the signal throughout the area, but directs the sectorized video signals to the audio processor/RF combiner. The audio processor/RF combiner combines the sectorized audio signals and the sectorized video signals before transmitting them to an antenna, which radiates the combined signal throughout the sector.

6 Claims, 4 Drawing Sheets

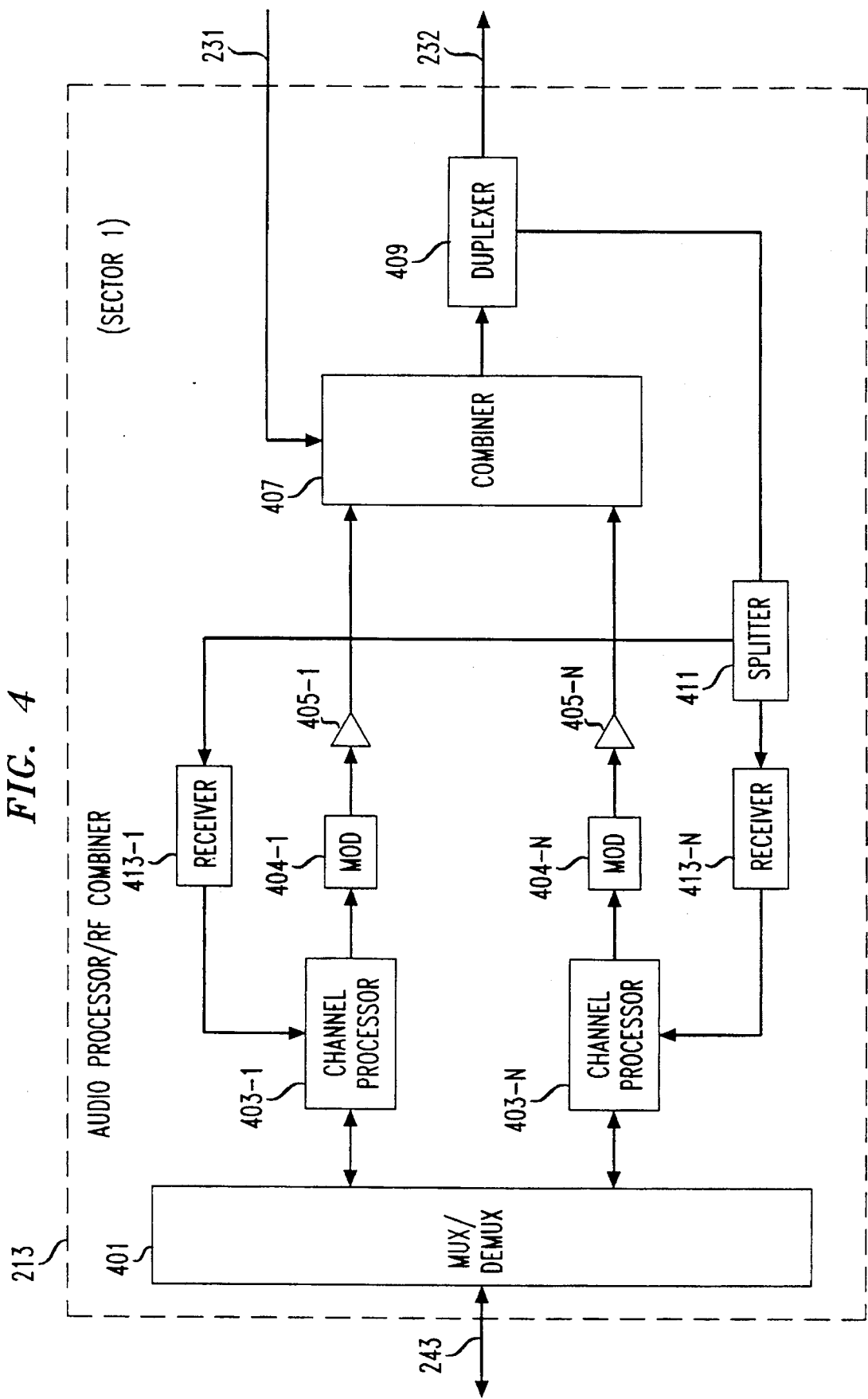

WIRELESS BASE STATION ARCHITECTURE

FIELD OF THE INVENTION

The present invention relates to electric circuit design in general, and more particularly, to a wireless base station architecture that can provide audio, data and video (i.e., multimedia) services.

BACKGROUND OF THE INVENTION

As the telecommunications industry prepares to deliver multimedia services to both residential and commercial customers via wireless access technologies, there arises the need for a wireless base station architecture that can efficiently provide those services over a wide range of geographical areas.

SUMMARY OF THE INVENTION

One embodiment of the present invention is a wireless base station architecture that is particularly well-suited for providing audio, video and data services. An exemplary embodiment preferably transmits to all of an area those "common services" (e.g., broadcast television) that are intended to be received by multiple recipients throughout the area, but, in contrast, transmits only into a sector those recipient-specific services (e.g., point-to-point voice services, interactive video services) that are intended for less than all of the recipients in the area.

In an exemplary embodiment, a demultiplexor directs both broadcast video and recipient-specific or "sectorized" video signals to a video processor, which prepares them for transmission. The demultiplexor also directs sectorized audio signals to an audio processor/RF combiner, which prepares them for transmission. The video processor preferably directs the broadcast video signals to an antenna, which radiates the signal throughout the area, but directs the sectorized video signals to the audio processor/RF combiner. The audio processor/RF combiner combines the sectorized audio signals and the sectorized video signals before transmitting them to an antenna, which radiates the combined signal throughout the sector.

BRIEF DESCRIPTION OF THE DRAWINGS

FIG. 4 depicts a block diagram of the preferred architecture of the audio processor/RF combiner shown in FIG. 2.

DETAILED DESCRIPTION

The disclosure of commonly-assigned, co-pending U.S. patent application Ser. No. 08/361,355, entitled "Broadband Wireless System and Network Architecture Providing Broadband/Narrowband Service with Optimal Static and Dynamic Bandwidth/Channel Allocation," filed Dec. 21, 1994, is incorporated by reference.

Figure 1:
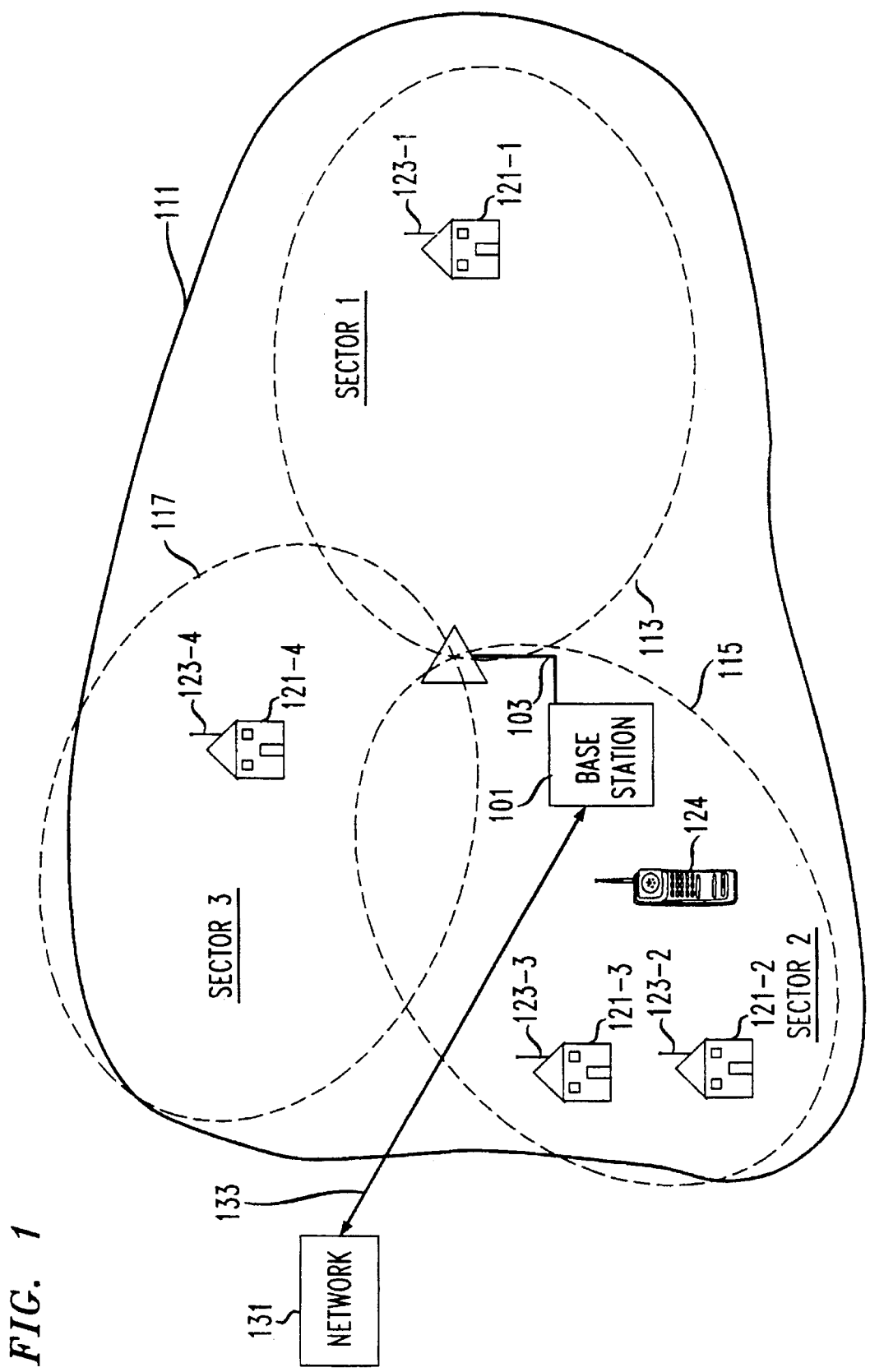
FIG. 1 depicts a schematic diagram of a geographic region that is serviced by a wireless base station in accordance with the exemplary embodiment of the present invention.

FIG. 1 depicts a schematic diagram of a geographic region, which comprises residential and commercial buildings 121-1 through 121-4 and personal communicator 124. Buildings 121-1 through 121-4 and personal communicator 124 each have access to audio, data and video services (i.e., multimedia services), via radio links with base station 101 and antenna system 103. Base station 101 is connected to local- and wide-area network 131 (e.g., the local- and long-distance telephone networks, private and public data networks, broadcast television networks, interactive video networks, etc.) via link 133, which link can be either wireline or wireless.

For the purposes of this specification, the terms "video service" and "video signal" are intended to include both a visual and associated audio component; the terms "audio service" and "audio signal" are intended to include only an audio (e.g. voice, music) component, and the terms "data service" and "data signal" are intended to include all other information services except video services and audio services. Typical data services include one-way point-to-multipoint and two-way point-to-point paging services.

For the purposes of efficient spectrum utilization, base station 101 preferably transmits to all of the region encompassed by perimeter 111 (hereinafter "area 111") those "common services" (e.g., broadcast television) that are intended to be received by multiple recipients throughout area 111. In contrast, the recipient-specific services (e.g., point-to-point voice services, interactive video services) that are intended for less than all of the recipients in the area are preferably only transmitted to a sector associated with area 111 that includes the intended recipient(s). For the purposes of this specification, these recipient-specific services shall alternatively be called "sectorized services." It is further preferred that all of the sectorized services within a given sector be conducted in different channels than the sectorized services that are conducted in adjacent sectors. The advantage of distinguishing between common services and sectorized services, and of broadcasting them in different channels, is that it permits each service to be broadcast to as small a geographic area as possible, which, in turn, facilitates channel reuse and enhances overall spectrum utilization.

Although geographic area 111 can be defined to have any number of sectors, the preferred number is three. Although sectors can be defined so that adjacent sectors overlap or have interstitial regions between them, it is generally preferred that they do not. Furthermore, while the aggregate area encompassed by all of the sectors need not necessarily coincide with the area encompassed by area 111, it is generally preferred that it does, unless there are regions where it is desirable not to provide such services. FIG. 1 depicts how three typical sectors, Sector 1, Sector 2, and Sector 3 have been defined.

Buildings 121-1 through 121-4 each have associated with them, respectively, radios 123-1 through 123-4, which interact, respectively, with base station 101 to receive both common and sectorized services.

Figure 2:
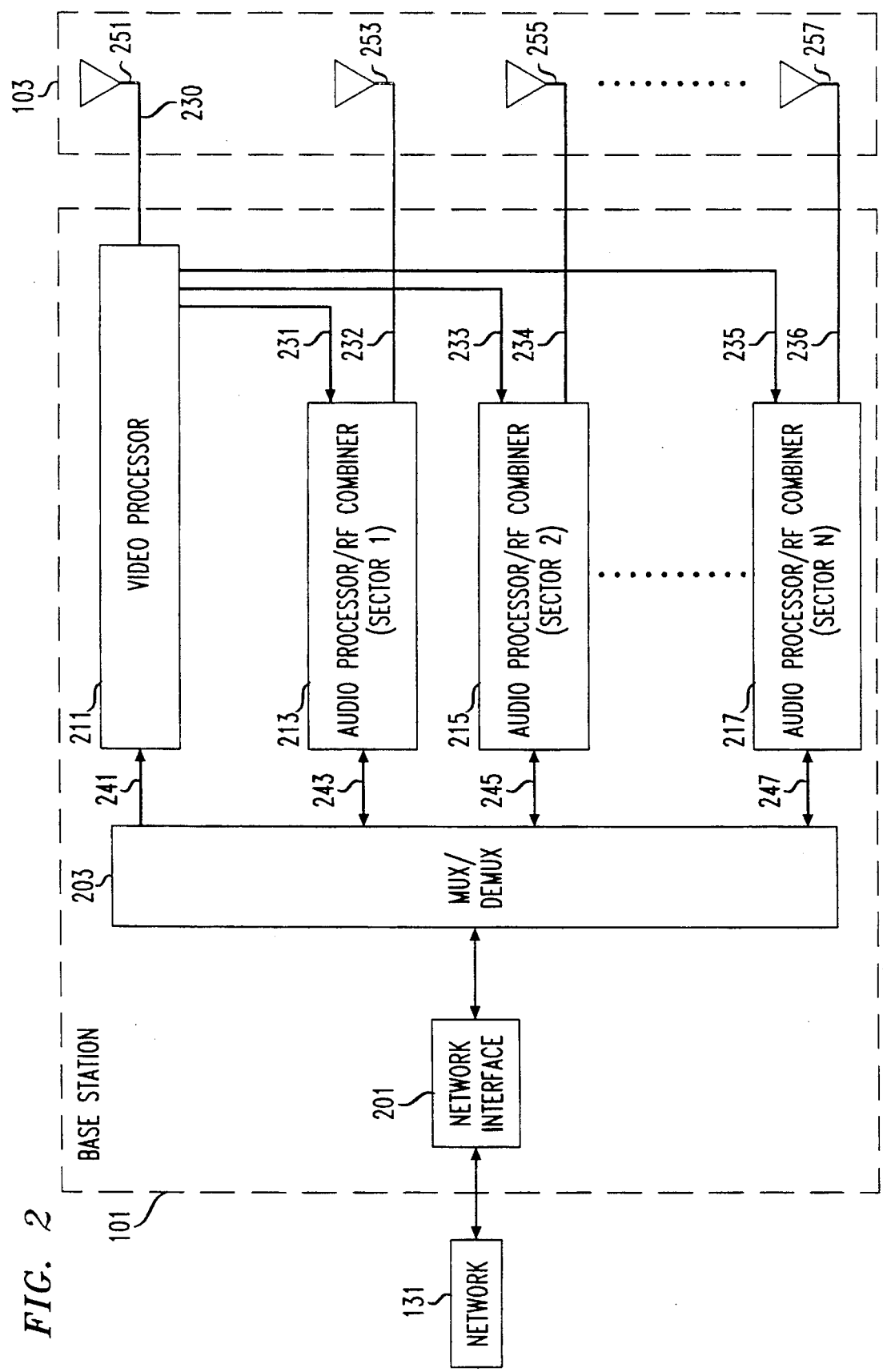
FIG. 2 depicts a block diagram of the architecture of the base station depicted in FIG. 1.

FIG. 2 depicts a block diagram of base station 101 and antenna system 103 in accordance with the exemplary embodiment, as it interfaces with network 131 and buildings 121-1 through 121-4 and personal communicator 124. Base station 101 preferably comprises network interface unit 201, multiplexor/demultiplexor 203, video processor 211, audio processor/RF combiner 213, audio processor/RF combinet 215 and audio processor/RF combiner 217.

Network 131 preferably provides a downstream digital bitstream (e.g., DS3) to base station 101 comprising: at least one broadcast video signal, which are all common services, at least one sectorized video signal, which are all sectorized services, and at least one audio signal, which are also sectorized services. Each broadcast video signal is advantageously a uni-directional downstream signal that could be, for example, a network television program. Each sectorized video signal is advantageously a uni-directional downstream video signal with an upstream data signal. Examples of sectorized video services include interactive video games and video-on-demand service. Each audio service is preferably bi-directional and comprises both a downstream audio channel and an upstream audio channel. Examples of typical audio services include, for example, common telephone service or narrowband ISDN service. An audio service could, alternately, be broadcast and uni-directional (e.g., analogous to commercial broadcast radio). Network 131 preferably also accepts from base station 101 an upstream digital bitstream that carries the upstream data and audio signals to the head end.

The preferred signal flow through base station 101 is as follows. Both the downstream broadcast video and sectorized video signals are directed to video processor 211 by multiplexor/demultiplexor 203, where they are processed for transmission. Video processor 211 preferably separates the broadcast video signals from the sectorized video signals and directs the broadcast video signals to antenna 251, via link 230. Video processor 211 preferably directs the various sectorized video signals to the audio processor/RF combiner that corresponds to the sector into which the respective sectorized video signals are to be transmitted.

The respective sectorized audio signals are preferably directed by multiplexor/demultiplexor 203 to the appropriate audio processor/RF combiner, where the audio signals are processed for transmission. In each audio processor/RF combiner, the respective sectorized video signal and sectorized audio signal are combined and directed to the corresponding sector antenna for transmission into that sector.

Network interface unit 201 is preferably the interface for base station 101 to network 131. Network interface unit 201 interconnects the digital bitstream to multiplexor/demultiplexor 203 at the appropriate digital level and formats required by multiplexor/demultiplexor 203. Typically, network interface unit 201 performs the physical layer functions (e.g., signal monitoring and electrical interface, device drivers).

When network 131 transmits signals to base station 101, multiplexor/demultiplexor 203 preferably takes the output of network interface unit 201, demultiplexes it and distributes both the broadcast and sectorized video signals to video processor 211, and the various sectorized audio signals to the appropriate audio processor/RF combiner.

Video processor 211 preferably takes both the broadcast and sectorized video signals from multiplexor/demultiplexor 203, and prepares them for transmission, directly or indirectly, via antenna system 103. The details of video processor 211 are described in greater detail in FIG. 3, which is described below.

It is preferred that there be one audio processor/RF combiner for each sector serviced by base station. Because the exemplary embodiment has three sectors, it therefore also preferably has three audio processor/RF combiners, one each dedicated to each sector.

Each audio processor/RF combiner preferably receives sectorized audio signals from multiplexor/demultiplexor 203, and prepares them for transmission via antenna system 103. Each audio processor/RF combiner preferably also receives a sectorized video signal from video processor 211 and combines it with its own audio signal before transmission to antenna system 103. The exemplary architecture of an audio processor/RF combiner is described in greater detail in FIG. 4.

Antenna system 103 preferably includes antenna 251, antenna 253, antenna 255 and antenna 257. Antenna 251 preferably broadcasts its signal to all of area 111. It will be clear to those skilled in the art that in some embodiments antenna 251 could be a virtual antenna that physically comprises one or more of antenna 253, antenna 255 and/or antenna 257. Each of antenna 253, antenna 255 and antenna 257 are sectorized antennas and broadcast its respective signal into one of sectors 1, 2 or 3, and receives any reverse direction signal from that sector. It is preferred that the exemplary embodiment has one sectorized antenna to service each sector in the embodiment. Antenna 253 preferably broadcasts the RF signal output from audio processor/RF combiner 213 into Sector 1. Analogously, antenna 255 preferably broadcasts the RF signal output from audio processor/RF combiner 215 into Sector 2, and antenna 257 preferably broadcasts the RF signal output from audio processor/RF combinet 217 into Sector 3. It will be clear to those skilled in the art how to build antenna system 103.

Figure 3:
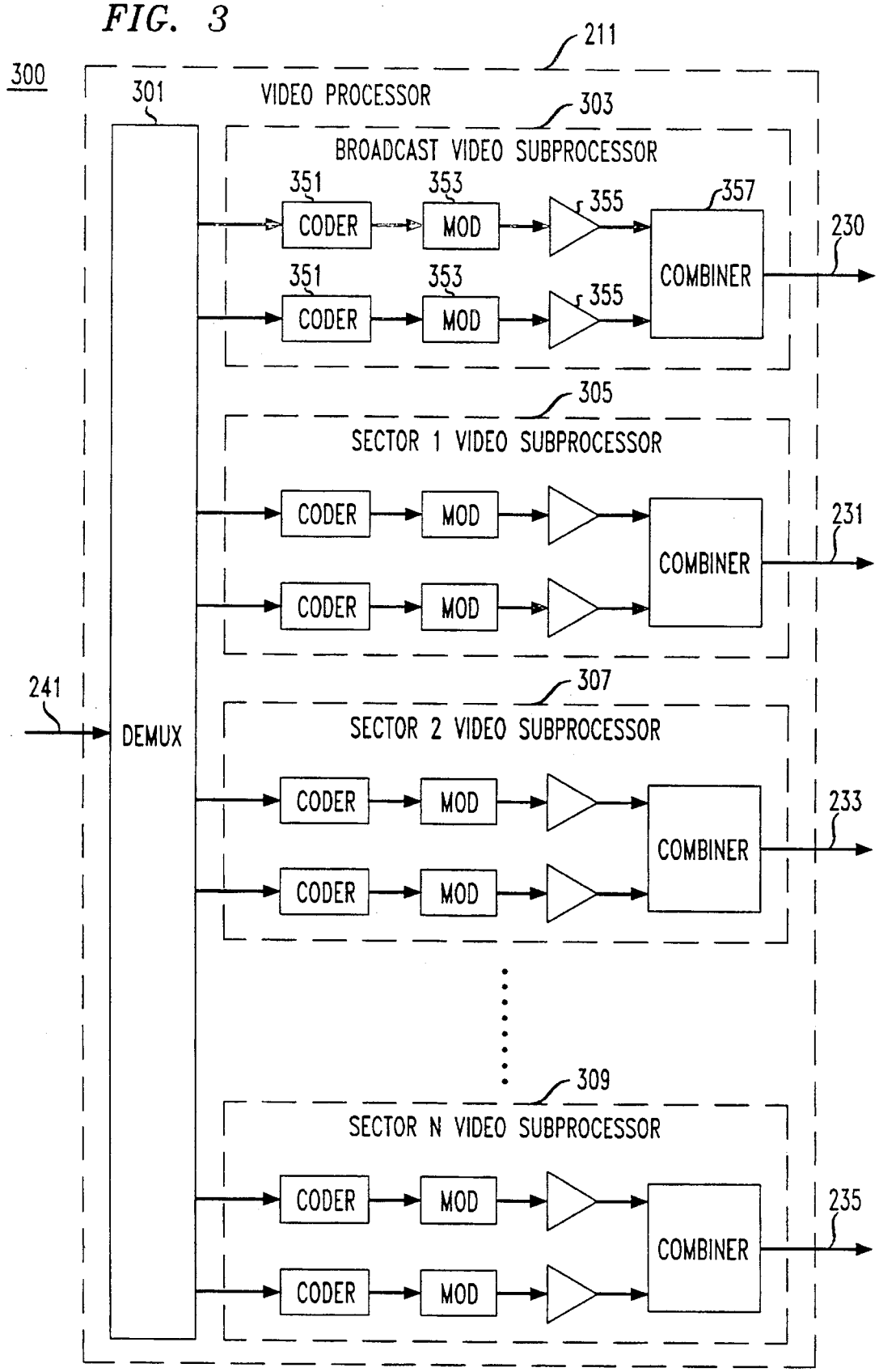
FIG. 3 depicts a block diagram of the preferred architecture of the video processor shown in FIG. 2.

FIG. 3 depicts a block diagram of the architecture of video processor 211. Video processor 211 preferably comprises: demultiplexor 301, broadcast video subprocessor 303, and at least two sectorized video subprocessors, one for each sector serviced by base station 101. In the exemplary embodiment, video processor 211 preferably comprises: Sector 1 video subprocessor 305, Sector 2 video subprocessor 307, and Sector 3 video subprocessor 309.

Demultiplexor 301 preferably receives the broadcast and sectorized video signals from multiplexor/demultiplexor 203, via link 241, and directs the broadcast video signals to broadcast video subprocessor 303 and the respective sectorized video signals to the appropriate sectorized video subprocessor.

Broadcast video subprocessor 303 preferably processes each of the video signals separately (through a coder, a modulator and an amplifier), then combines them (with combiner 357) and sends the combined signal to antenna 251, via lead 230. Each coder 351 preferably performs the channel coding functions on the video signal. Each modulator 353 preferably takes the baseband video signal from the associated coder and creates the RF modulated video signal. It is preferred that 16 Quadrature Amplitude Modulation (QAM) be the modulation scheme. Each amplifier 355, which is advantageously a linear amplifier, preferably amplifies the RF modulated video signal, from the associated modulator, to the appropriate level for transmission, and each combiner 357 preferably combines all of the video signals that are intended to be broadcast over the same antenna.

Each sector video subprocessor is preferably identical to each other and is advantageously the same as broadcast video subprocessor, except that their output is directed to one of the audio processor/RF combiners instead of directly to an antenna.

FIG. 4. depicts a block diagram of the architecture of audio processor/RF combiner 213. Each audio processor/RF combiner is preferably identical to audio processor/RF combiner 213. Audio processor/RF combiner 213 preferably comprises enough processing capability to process at least one audio channel. In the embodiment depicted in FIG. 4, audio processor/RF combiner 213 advantageously comprises: multiplexor/demultiplexor 401, at least one channel processor 403-N, at least one modulator 404-N, at least one amplifier 405-N, combiner 407, duplexer 409, splitter 411, and at least one receiver 413-N.

Multiplexor/demultiplexor 213 splits the incoming stream into groups of audio channels, each of which is to be processed by a single channel processor. Channel processor 403-N provides two functions: (1) it performs voice coding and decoding functions, and (2), it performs the channel coding functions. Modulator 404-N preferably takes the baseband digital signals from channel processor and creates the RF modulated audio signal. Amplifier 405-1, which is advantageously a linear amplifier, preferably amplifies the RF modulated audio signal, from the associated modulator, to the appropriate level for transmission. Combiner 407 preferably combiner all of the audio signals to be broadcast into Sector 1 and the RF modulated sectorized video signal from Sector 1 video subprocessor 305. Duplexer 409 takes the combined signals and transmits them to antenna 253, via lead 232. Duplexer 409 also separates the reverse direction audio signals from antenna 253 to splitter 411 and isolates splitter 411, receiver 413-1 through receiver 413-N from the powerful transmitted signal emitted from combinet 407. Splitter 411 splits the reverse direction audio signals for transmission to receiver 413-1 through 413-N. Receiver 413-1 through 4 13-N are preferably paired with channel processor 403-1 through 403-N and perform the inverse function of modulator 404-1 through modulator 404-N. From receiver 413-1 through 413-N, the received signal is fed back into channel processor 403-1 through channel processor 403-N, which performs the audio and channel decoding functions and then feeds the signal to multiplexor/ demultiplexor 401 for transmission back to network 131.

What is claimed is:

1. A wireless base station comprising:

a demultiplexor for receiving at least one common service video signal, which is intended to be broadcast to an area, at least one sectorized service video signal, which is intended to be broadcast to a sector, and at least one sectorized service audio signal, which is intended to be broadcast to said sector, and for directing said common service video signal and said sectorized service video signal to a video processor, and for directing said sectorized service audio signal to an audio processor/ RF combiner;

said video processor for preparing said common service video signal and said sectorized service video signal for broadcast, for directing said common service video signal to a first antenna, which radiates said common service video signal to said area, and for directing said sectorized service video signal to said audio processor/ RF combinet; and said audio processor/RF combiner for preparing said sectorized service audio signal for broadcast, for combining said sectorized service audio signal and said sectorized service video signal to form a combined signal, and for directing said combined signal to a second antenna, which radiates said combined signal to said sector.

2. The wireless base station of claim 1 wherein said base station is designed to provide service to three sectors.

3. The wireless base station of claim 1 wherein said video processor comprises:

a broadcast video subprocessor; and at least three sectorized video subprocessors.

4. The wireless base station of claim 3 wherein said broadcast video subprocessor comprises at least two amplifiers and a combiner.

5. The wireless base station of claim 3 wherein each of said sectorized video subprocessors comprises at least two amplifiers and a combiner.

6. The wireless base station of claim 1 wherein said audio processor/RF combiner comprises at least two amplifiers and a combiner.

* * * * *